Dec. 17, 1935.  P. E. KLOPSTEG  2,024,231
APPARATUS FOR STUDYING ACCELERATION
Filed Feb. 3, 1930  3 Sheets-Sheet 2
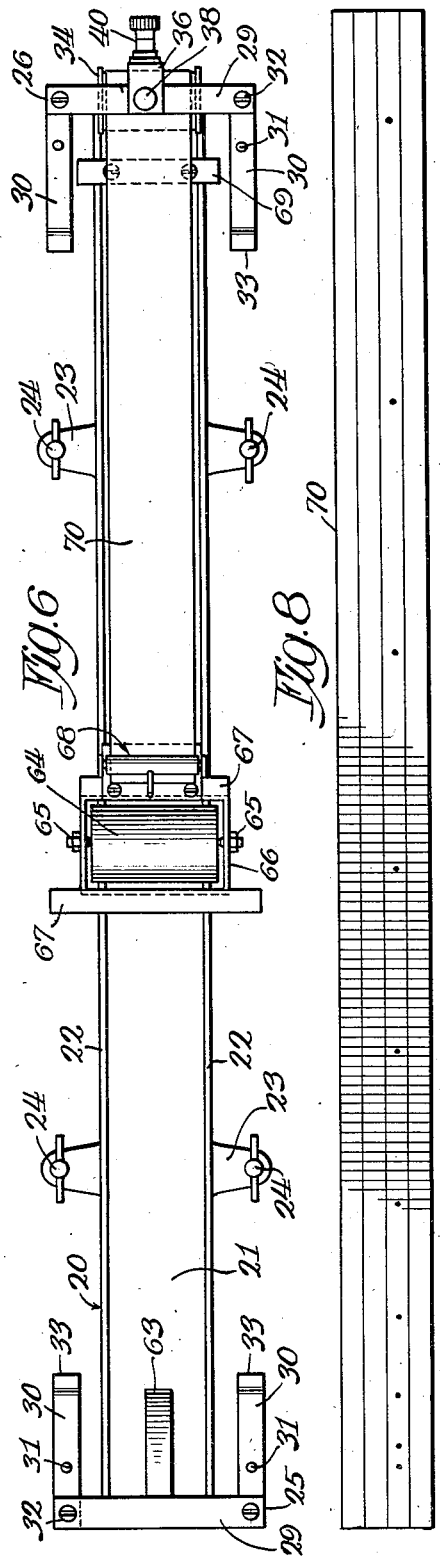
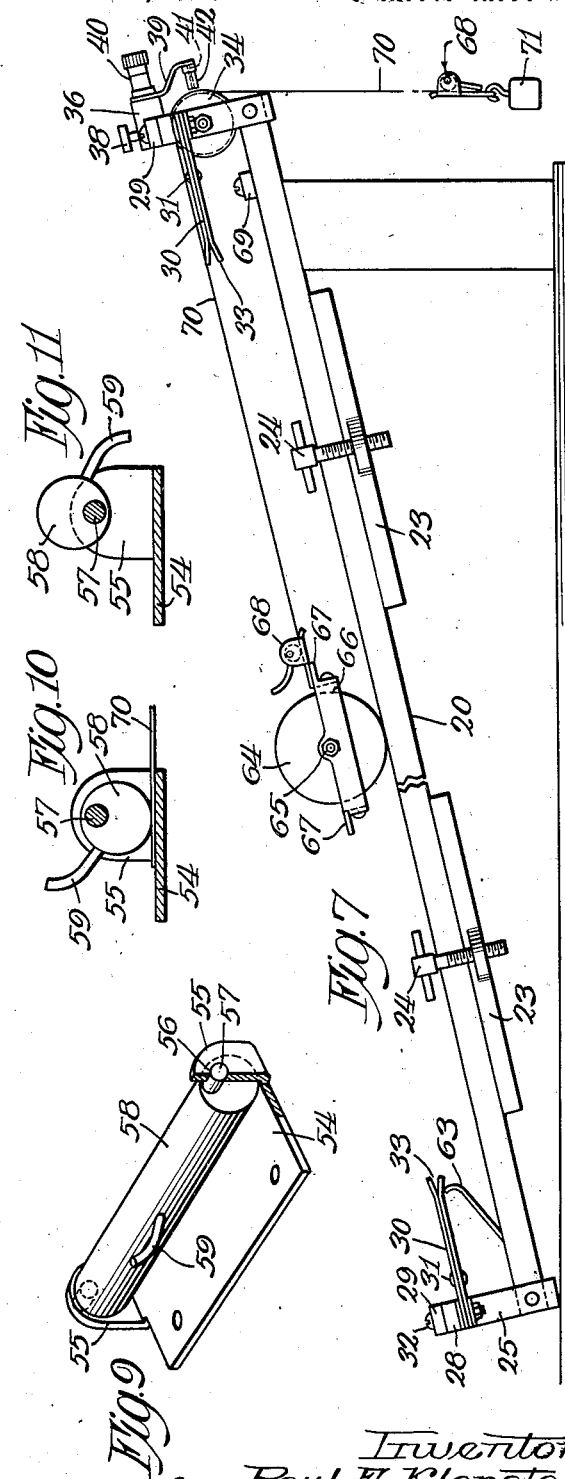
Inventor
Paul E. Klopsteg
By Gillson, Mann & Co.
Attys.

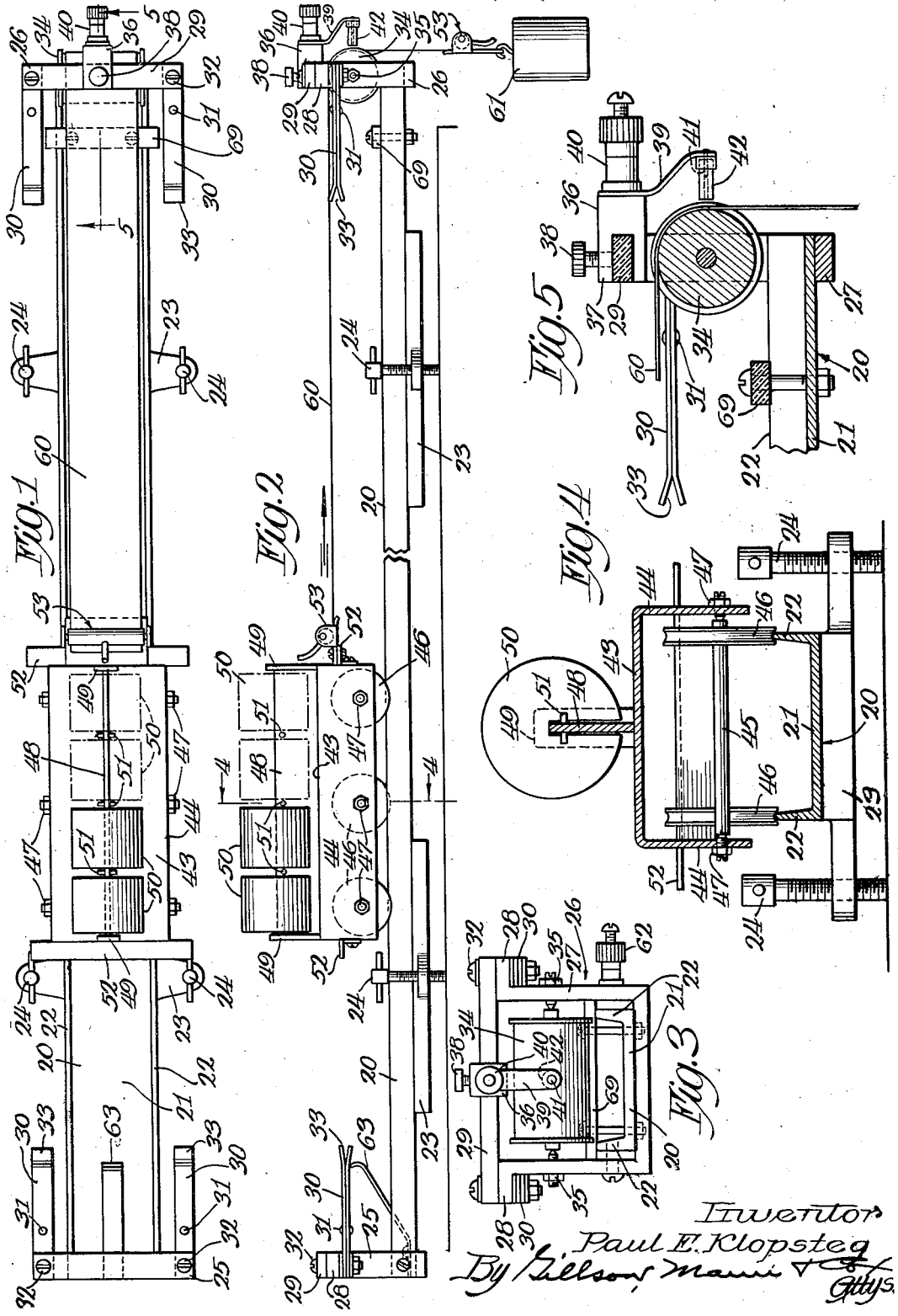

Dec. 17, 1935.    P. E. KLOPSTEG    2,024,231
APPARATUS FOR STUDYING ACCELERATION
Filed Feb. 3, 1930    3 Sheets-Sheet 3

Inventor
Paul E. Klopsteg

Patented Dec. 17, 1935

2,024,231

UNITED STATES PATENT OFFICE 2,024,231

APPARATUS FOR STUDYING ACCELERATION

Paul E. Klopsteg, Chicago, Ill., assignor to Central Scientific Company, a corporation of Illinois Application February 3, 1930, Serial No. 425,522

23 Claims. (Cl. 73—51)

The principal object of this invention is to provide a simple and sturdy apparatus for experimental and demonstrative study of the motion of masses under the application of various forces; to produce permanent records of data that may form part of the student's report; and to simplify the reduction of records to numerical data for calculations.

Other objects of the invention will become apparent as the disclosure proceeds and the description is read in conjunction with the accompanying drawings, in which Fig. 1 is a plan view of one form of the apparatus adapted to demonstrate the motion of masses when made to travel in a horizontal plane.

Fig. 2 is a side elevational view of the same.

Fig. 3 is an end elevational view of the horizontal plane apparatus showing particularly the device for delivering sparks to the record strip.

Fig. 4 is a vertical, sectional view taken on the line 4—4 of Fig. 2 showing details of the car and track;

Fig. 5 is a fragmentary sectional view taken on the line 5—5 of Fig. 1 illustrating the timer device;

Fig. 6 is a plan view of the apparatus set up for making experiments along an inclined plane;

Fig. 7 is a side elevational view of the same;

Fig. 8 is a view showing the record strip with spark impressions recorded thereon;

Fig. 9 is a perspective view showing the type of clip used to connect the moving mass with the record strip;

Figs. 10 and 11 are sectional views taken through one of the trunnions of the clip and showing different positions of the same;

Figures 12, 13, 14:
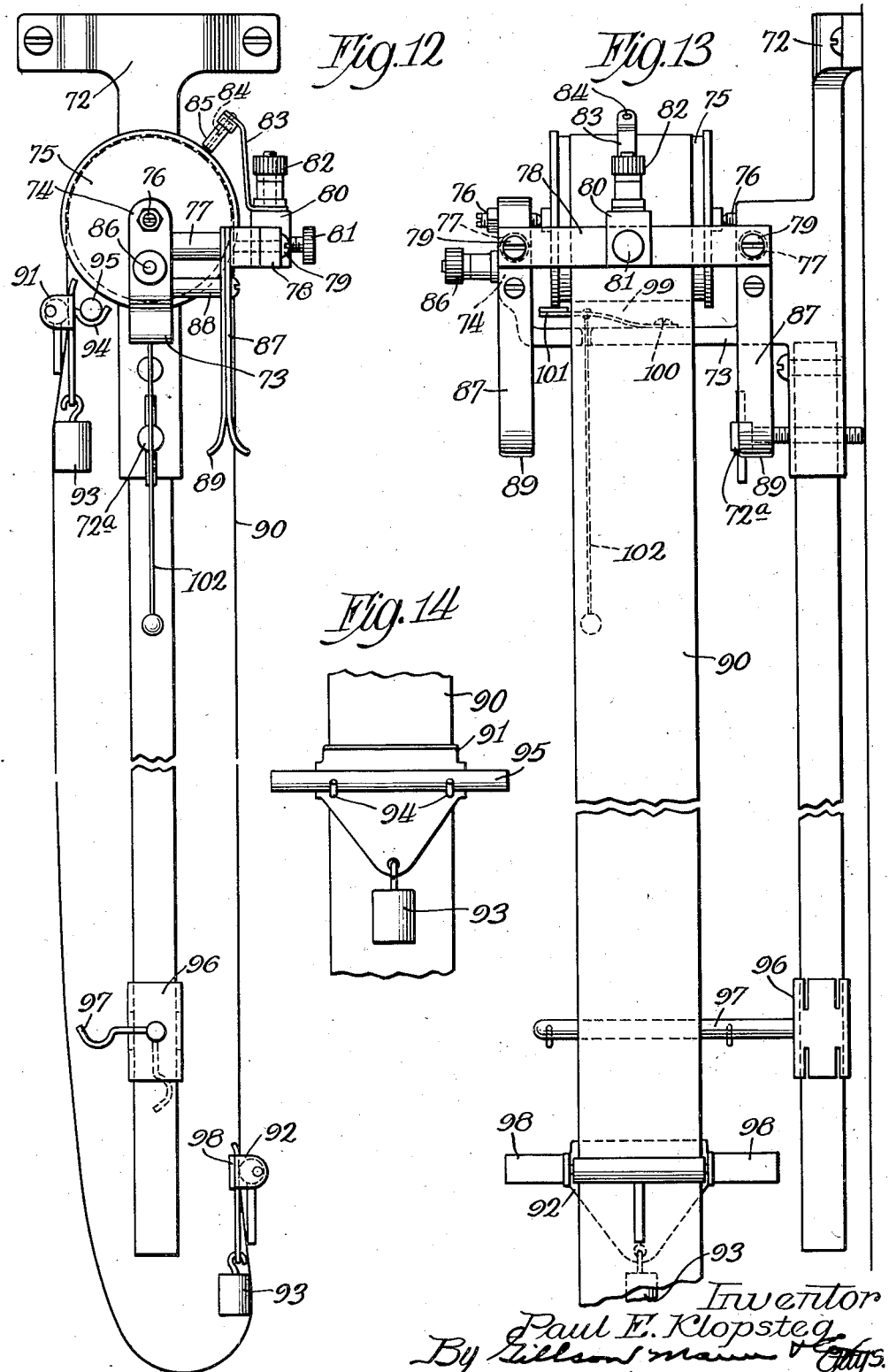
Fig. 12 is a front elevational view of the apparatus in the form of an Atwood machine and embodying the features of this invention.
Fig. 13 is a side elevational view of the same.
Fig. 14 is a rear view of one of the clips and illustrating the manner in which the propelling weight is carried by the clip.

The apparatus includes in its general organization a mass whose motion is to be studied, a strip of specially prepared paper secured to the mass and adapted to receive an impression when perforated by an electric spark, and a device for sending the spark impulses through the strip at equal intervals of time.

Three embodiments of the invention have been illustrated and will be described, one taking the form of a rolling mass moving along a horizontal plane; another employing a rolling mass moving along an inclined plane; and the third in the form of an Atwood machine.

But these specific illustrations and the corresponding specific description are for the purpose of disclosure only, it being realized that this invention may be embodied in a variety of forms, all of which are within the purview of this invention, as indicated by the appended claims.

Horizontal plane apparatus

The track comprises a channel bar section 20 having a horizontal web 21 with side flanges 22 which are carefully machined to insure that the edges of the rails are smooth and lie in the same plane. The track beam is carried by elongated brackets 23 which are provided with leveling screws 24 for accurately placing the track in a horizontal plane. These screws may be adjusted by extending one and retracting the other to also support the track beam in an inclined position. The ends of the track beam are seated in and clamped to U-shaped frames or car stops 25 and 26 which rise from the beam and have outwardly turned flanges 28 which carry a cross-piece 29 of insulating material such as bakelite, or the like.

Each frame is provided with friction buffers in the form of elongated springs 30 of phosphor bronze, or the like, riveted together at 31 and carried by bolts 32 which pass through the cross piece 29 and the flanges 28 of the frame.

The inner ends of the buffers are spread apart as at 33 to cooperate with a suitable bar provided on the moving mass. The frame 26 is equipped with a light, wide-faced aluminum pulley 34 journaled in conical bearings 35 in the sides of the frame and which are adjustable to insure a substantially frictionless movement of the pulley.

The spark timer is carried by the cross piece 29 and comprises a block 36 having a bifurcated face 37 which engages the cross piece and is adjustably secured thereto by a set screw 38. The rear face of the block carries an arm 39 secured by and electrically connected with the binding post 40 and which is equipped at its lower extremity with a spark point 41 fitted with a hollow shell or skirt 42 of some suitable non-carbonizing insulating material, such as glass, extending beyond the end of the point. The arm 39 is of such shape as to bring the spark point in juxtaposition to the pulley, and the insulating shell 42 serves to deliver the spark to the pulley in a direct line between the two.

The moving mass which has been illustrated with the horizontal plane device is a car of channel section, cast or formed from aluminum or other metal, and having a horizontal web 43 with downwardly extending flanges 44. The car axles 45 are each equipped with a single wheel 46, lathe turned, and curved to a radius slightly in excess of that of the track rails, thus providing a line contact between the wheels and the rails. To minimize friction, the wheels of the car are hardened and then ground to perfect roundness. The two end wheels lie in a common plane and run on the same rail, the intermediate wheel lies adjacent the opposite flange and travels along the other rail. The axles are journaled in conical bearings 47 in the flanges 44 and are adjustable to correct for wear and to permit a movement of the car along the rails with a minimum of friction.

It will be understood that a car provided with three axles and three wheels as above described is preferred over a car constructed in a conventional manner with two axles and four wheels for the reason that there is one less wheel in frictional engagement with the track.

The top of the car is provided with a rack 48, having end pieces 49, which is adapted to receive slotted weights 50 held against movement on the car by pins 51.

Each end of the car has a horizontal bar 52, the ends of which extend beyond the sides of the car and which cooperate with the buffers to bring the car to a cushioned stop at the end of its travel. Secured to one of the bars 52 is a clip 53 shown most clearly in Figs. 9, 10 and 11 and which comprises a plate 54 having upturned flanking lugs 55 apertured at 56 to receive eccentric trunnions 57 of the cylindrical pin 58. A handle 59 is provided to turn the pin in its bearings.

The clip is designed to provide a quick means for securing a record strip 60 to the car, the end of the strip being inserted between the pin 58 and the plate 54 and clamped in position by rotation of the pin as shown particularly in Fig. 10.

The record strip 60 passes over the pulley 34 and has a weight 61 secured to it at its other end by a clip similar to that employed on the car. It will be seen that a simple turn of the eccentric pin causes the record strip 60 to be clamped between the pin and the supporting plate.

The sensitized paper which is used to record the movement of the car is made up of a sheet having a coating more sensitive to or which is affected to a greater extent by a spark than is the base sheet. Ordinary paper when pierced by a spark leaves no visible mark but if coated with a suitable substance, such as paraffin, or the like, the heat of the spark will melt away or burn a bit of the paraffin coating and leave a permanent perceptible mark. In other words, if the paper is coated with a substance offering comparatively high resistance to an electric current and possessing a comparatively low melting point, an electric spark in piercing the sheet will generate enough heat to melt or burn a portion of the coating and thereby form the desired record of the point where the spark pierced the strip. A commercial product which has been found satisfactory for this purpose is one which is in common use as a substitute for carbons in making copies on a typewriter, and comprises a colored paper base coated on one side with paraffin which gives to it the property of making a visible marking on the paper when pierced by an electric spark. The record strip may have printed on it uniformly spaced graduations to assist the student in determining the distances between the spark perforations.

It has been found convenient to refer to the spark point assembly, which includes the block 36, arm 39, point 41 etc., as the spark timer, but it is obvious that the term also implies a mechanism, not shown, designed to deliver an intermittent potential to the spark point at equal intervals of time. A synchronous motor equipped with a circuit breaker (as shown in the copending application of Winfield H. Stannard, Ser. No. 518,715, filed February 27, 1931, or a vibrating fork so equipped, are examples of such mechanism. Since such devices are well-known in the art, it is not thought necessary to illustrate or further describe the same.

In making the experiment with the horizontal plane apparatus, the track is first carefully leveled and then the car is placed on the track and the recording strip and propelling weight attached. The car is brought back to a position adjacent the left end of the beam in Figs. 1 and 2, the spark timer is started, and the car is then released. As the car is moved toward the right by the weight 61 acting through the record strip, sparks are delivered to the pulley and hence through the record strip from the spark point, causing a series of impressions to be made upon the strip at distances which, when measured, allow calculations to be made to determine the relations between velocity, acceleration, time and distance. A binding post 62 is provided on the frame for completing the electrical circuit through the pulley.

The car is brought to rest, without violent shock, by the buffers at the end of the track which engage the cooperating bar 52 provided on the car. This bar enters between the strips 30 of the buffer and the resulting friction brings the car to rest.

The same record strip may be used a number of times to obtain additional data for computations by simply adjusting the spark delivering device to a different position on the cross piece 29. To avoid unpleasant shocks, it is advisable that the track beam be grounded and for this purpose a binding post 62 is provided.

*Inclined plane apparatus*

To test the principle of the conservation of energy, the same apparatus as used in the horizontal plane experiment may be employed. In this case, the track beam is inclined to some given angle and the car is brought to a position adjacent the pulley end of the beam and is then allowed to roll down the track carrying with it the record strip and a suitable weight. The sparks which are delivered to the strip impress upon it a record of the car's motion and give sufficient data to make the necessary calculations. The bar 52 at the end of the car opposite the clip 53 enters the buffer at the lower end of the track and brings the car to rest assisted by an auxiliary spring 63 secured to the base of the track beam.

Although possible to employ the identical apparatus used in the horizontal plane experiment for making the demonstration with the inclined plane, a rolling cylinder may be advantageously substituted for the car to show that in the case of a rotating body having a large moment of inertia, the energy is mostly rotational while in the case of the car, the kinetic energy is translational. Incidentally, the simple geometric form of the cylinder tends to simplify calculations.

A steel cylinder 64 is mounted in substantially frictionless bearings 65 carried by a frame 66 and having friction bar 67 and a clip 68, the latter two elements being similar to the bars 52 and the clip 53, respectively, of the car already described. The cylinder is carefully turned to present a true cylindrical surface and is alined on the track by bringing it in contact with a bar 69 set at exactly 90° across the track beam.

The record strip 70 is then clamped to the cylinder by the clip 68, is passed over the pulley 34, and the weight 71 is secured to the other end of the strip by another of the eccentric pins and clips. The spark device is then started and the cylinder is released and allowed to roll down the inclined plane where it is brought to rest by the buffers at the lower end of the track engaging the friction bar 67 of the cylinder frame. This experiment may also be repeated using the same record strip by clamping the spark delivering block at different positions along the cross piece 29.

*Atwood machine*

This device comprises a wall bracket casting 72 secured at its upper end to a wall and having its lower end spaced therefrom by a leveling screw 72a. The casting has a laterally extending arm 73, the extremity of which is turned up at 74 and carries a pulley 75 in substantially frictionless conical bearings 76.

A frame projects horizontally from the laterally extending arm 73 and comprises a pair of posts 77, between the top of which a cross piece 78 of insulating material, such as bakelite, or the like, is secured by screws 79. A block 80 is slotted to fit over the cross piece 78 and may be clamped at any position thereon by manipulation of a set screw 81. Secured to one face of the block by a binding post 82 is an arm 83 which extends upwardly and carries at its extremity a spark point 84 encased by a cylindrical shell 85 of insulating material, such as glass. The frame is grounded by a conductor leading from the binding post 86.

Depending from and secured to the spark point frame are a pair of friction buffers 87 similar to the buffers provided on the ends of the track beam already described and which are held in rigid relation to the frame by spacers 88. The ends of the buffers are spread as at 89.

A strip of sensitized paper 90 is looped over the pulley 75 and carries a clip 91 which, at the initial position of the apparatus, is adjacent the pulley, and a second clip 92 which joins the ends of the strip into a complete loop so as to automatically compensate for the change in weight of the strip as it passes over the pulley.

The clip 91 is of the type already described and besides being provided with an aperture for carrying the mass 93 is also equipped with fingers 94 on its rear face for carrying an accelerating weight 95, as shown most clearly in Fig. 14. A sleeve 96 slidably mounted on the wall bracket carries a fork 97 which removes the accelerating weight from the clip 91 when the record has run a desired distance over the pulley. The forks 97 being carried on an arm rotatably mounted in the sleeve 96 can be turned downward through 90° so as to be out of the way when not in use.

The clip 92 is also of the eccentric pin type and is equipped with laterally extending arms 98 engageable in the friction buffers 87 when the mass has reached the limit of its travel. This clip also carries a mass 93.

The pulley is normally held against rotation by a leaf spring 99 secured at 100 to the pulley arm and tipped with a rubber cushion 101 which engages the flanges of the pulley. A pull cord 102 depending from the spring, operates the release and must be held down during the experiment. When allowed to spring back into its normal position, the rubber tipped spring acts as a brake and quickly brings the pulley to rest.

The initial position of the apparatus is shown in Figs. 12 and 13. After the apparatus has been carefully adjusted to a vertical position by means of a plumb bob and the accelerating weight 95 is in place, the spark timer is started and the pulley released whereupon the record strip is caused to pass over the pulley and is punctured by the sparks delivered at equal intervals of time. After the accelerating weight has been removed by the fork, the cord is released and the device is thereby stopped.

Different accelerating weights may be used and the experiment may be repeated a number of times, in each case, the spark point being moved into a different position with relation to the pulley. As the strip runs the length of its record, the fork 97 removes the accelerating weight and the laterally extending arms 98 provided on the clip 92, enter the friction buffer 87 and bring the strip with its associated weights to a smooth stop without sudden impact.

These three pieces of apparatus just described enable the student to make accurate experiments involving the relationship between mass, forces and acceleration, and furnish him with a permanent record from which he can make the necessary calculations. The experiments which can be performed with these apparatus are accurate and convincing and permit the student to verify for himself the principles which he has learned from textbooks.

The design of these structures tends to lengthen the life of the apparatus, inasmuch as sudden shocks and impacts have been reduced to a minimum by friction buffers. This also serves to maintain the accuracy of the apparatus.

I claim as my invention:—

1. In apparatus of the class described, a track beam, a pulley journaled at one end of the track beam, a mass adapted to travel along the beam, a record strip connected at one end with the mass and running over the pulley, a weight connected to the other end of the strip, and a spark point adjacent the strip adapted to send sparks through the strip at equal intervals of time.

2. In apparatus of the class described, a track beam, a pulley journaled at one end of the track beam, a mass adapted to travel along the beam, a record strip connected at one end with the mass and running over the pulley, a weight connected to the other end of the strip, and a spark point adjacent but on the opposite side of the strip from the pulley.

3. In apparatus of the class described, a track adapted to be placed on a table or similar flat surface, said track comprising a beam of channel section having the flanges turned up to form rails, resilient means forming a car stop at one end of the beam, and a pulley having a horizontal axis journaled at the same end of the beam.

4. In apparatus of the class described, a track adapted to be placed on a table or similar flat surface and support a car adapted to be pulled therealong by means including a flexible member, said track comprising a beam of channel section having the flanges turned up to form rails, a pulley for said flexible member supported at one end of said track, means for adjusting the level of the track on the table or other flat surface, and a resilient car stop adjacent to one end of the beam extending above said rails.

5. In apparatus of the class described, a track adapted to be placed on a table or similar flat surface, said track comprising a beam of channel section having the flanges turned up to form rails, a frame rising from the beam at one end, a mass supported by and movable along the track wholly above the same, a pulley mounted on said frame, a weight, a flexible member attached to said mass and weight and extending over said pulley, moving said mass along said track by the action of gravity, and means carried by the mass and cooperating with the frame to bring the mass to a cushioned stop when it reaches the end of the track.

6. In apparatus of the class described, a track beam, a frame rising from one end of the beam, a pulley journaled in the frame over which a record strip is adapted to travel, and a spark point carried by the frame adjacent to the pulley for delivering sparks to said pulley through said record strip.

7. In apparatus of the class described, a track beam, a frame rising from one end of the beam, a pulley journaled in the frame, a spark point carried by the frame adjacent to the pulley, and a buffer comprising a pair of leaf springs projecting from the frame over the beam.

8. In apparatus of the class described, a track beam adapted to be placed on a table or other flat surface, having a track on the upper side thereof for supporting a car adapted to be pulled therealong by means including a flexible member, a support extending upward from one end of said beam, a buffer secured to said support, a pulley for said flexible member mounted on said support in alignment with said track adjacent one end of the beam, a plurality of bases secured to the lower side of the beam, and leveling screws in the bases.

9. In apparatus of the class described, a car comprising a channel shaped frame with flanges extending downwardly, a plurality of axles extending between the flanges, a single wheel for each axle, and pointed pivot bearings mounted in the flanges and engaging the ends of the axles.

10. In apparatus of the class described, a car comprising a channel shaped frame with flanges extending downwardly, an axle adjacent to each end of the frame, a single wheel on each axle adjacent to one of the flanges, a third axle between the two mentioned, and a wheel on the third axle adjacent to the other flange.

11. In apparatus of the class described, a car comprising a channel-shaped frame with flanges extending downwardly, axles between the flanges, grooved wheels on the axles adapted to run on a track, and a transverse horizontal bar projecting laterally on each side of the frame to cooperate with a buffer.

12. In apparatus of the class described, a mass whose motion is to be recorded, a pulley, a record strip connected at one end with the mass and running over the pulley, means for mounting the mass so that it may move with a minimum of friction, a spark point adjacent to said strip adapted to transmit sparks to the strip at equal intervals of time, and a friction stop for the mass.

13. In apparatus of the class described, a mass whose motion is to be recorded, a pulley, a record strip connected at one end with the mass and running over the pulley, means for mounting the mass so that it may move with a minimum of friction, a spark point adjacent but on the opposite side of the strip from the pulley, and a friction stop for the mass.

14. In apparatus of the class described, a mass whose motion is to be recorded, a pulley, a record strip connected at one end with the mass and running over the pulley, means for mounting the mass so that it may move with a minimum of friction, a spark point adjacent to said strip adapted to transmit sparks to the strip at equal intervals of time, a friction stop for the mass, and a bar carried by the mass cooperating with the stop.

15. In apparatus of the class described, a track comprising a beam of channel section having the flanges turned up to form rails, a frame rising from the beam at one end, a friction buffer projecting over the beam from the frame, and a bar at the other end secured across the rails at right angle to the beam.

16. In apparatus of the class described, a track beam, a frame rising from one end of the beam, a pulley journaled in the frame, a mass adapted to travel along the beam, a record strip connected at one end with the mass and running over the pulley, a weight connected to the other end of the strip, a spark point carried by the frame in juxtaposition to the periphery of the pulley and transversely adjustable with respect to the strip.

17. In apparatus of the class described, a track beam, means for supporting the same in a substantially horizontal position, a mass supported by and movable along the track while the latter is in horizontal position, a spark sensitive element adapted to receive spark impressions for recording the movement of the mass along the track, a spark point element adjacent to said sensitive element adapted to transmit sparks through the spark sensitive element at equal intervals of time, one of said elements being movable with the mass and the other being stationary.

18. In apparatus of the class described, a track beam, a mass supported by and movable along the track, a pulley journalled at one end of the beam, means including a vertically movable weight for imparting movement to the mass, a spark sensitive element adapted to receive spark impressions for recording the movement of the mass along the track, a spark point element adjacent to said sensitive element adapted to transmit sparks through the spark sensitive element at equal intervals of time, one of said elements being movable with the mass and the other being stationary.

19. In apparatus of the class described, a track beam, means for supporting same in a substantially horizontal position, a mass supported by and movable along the track, and means for recording the movement of the mass, said means including a record strip and a marking device, one of which is movable with the mass, and the other stationary, said device comprising an electrical conductor adjacent to said strip for transmitting sparks to the strip.

20. In an apparatus for studying acceleration of moving bodies, a moving mass, a pulley, means for supporting the mass including a record strip extending over said pulley, means for causing said strip to move over said pulley, and a pointed electric conductor adjacent to said pulley and strip, said strip extending between said pointed conductor and pulley, said pointed conductor being adapted to transmit sparks of electricity to said pulley through said record strip.

21. In an apparatus of the class described, a track having means for supporting the same in either a horizontal or an inclined position, a pulley at one end of said track, a carriage movable along the track, a record strip secured to said carriage and extending over said pulley, a weight on the free end of said strip, a stop adjacent to said pulley, said stop comprising a pair of spring arms, said arms being divergent at their free ends and substantially straight throughout the remainder of their resilient portions, and means on said carriage for engaging between said arms for gradually stopping the movement of said carriage toward said pulley.

22. In an apparatus of the class described, a support, a mass carried directly by the support and movable longitudinally thereof, a weight for moving said mass, a record receiving member, marking means including two electrode members arranged on opposite sides of said record receiving member opposite each other for forming a single spark gap, one of said electrode members being a spark point and at least two of said members being movable relative to the third member and movable with said mass, and means including said electrode members for delivering electric sparks to said record receiving member at equal intervals of time.

23. In an apparatus of the class described, a beam having a track thereon, a mass whose motion is to be measured directly supported on said track, a weight for moving said mass along said track, a record-receiving strip member, means including electrodes having a spark point for passing sparks from said point through said strip member at equal intervals of time, and means for effecting relative movement of said point and strip member responsive to movement of the mass.

PAUL E. KLOPSTEG.